Figure 1:
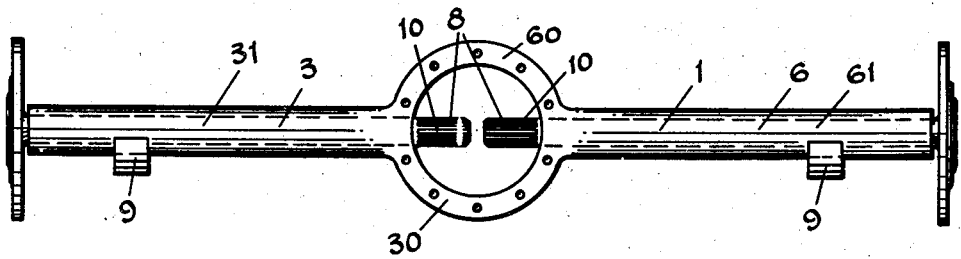

April 19, 1949.　　　　B. H. URSCHEL　　　　2,467,605
AXLE HOUSING AND GEAR CASING UNIT
AND METHOD OF MAKING SAME Filed May 2, 1946　　　　　　　　　　　　2 Sheets-Sheet 1

Inventor
Bertis H. Urschel
Attorney

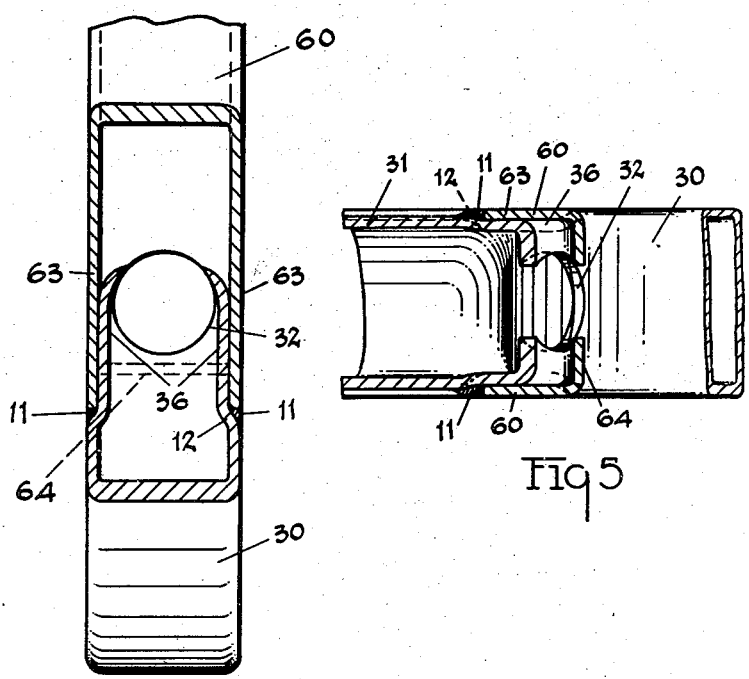
Fig 4
Fig 5
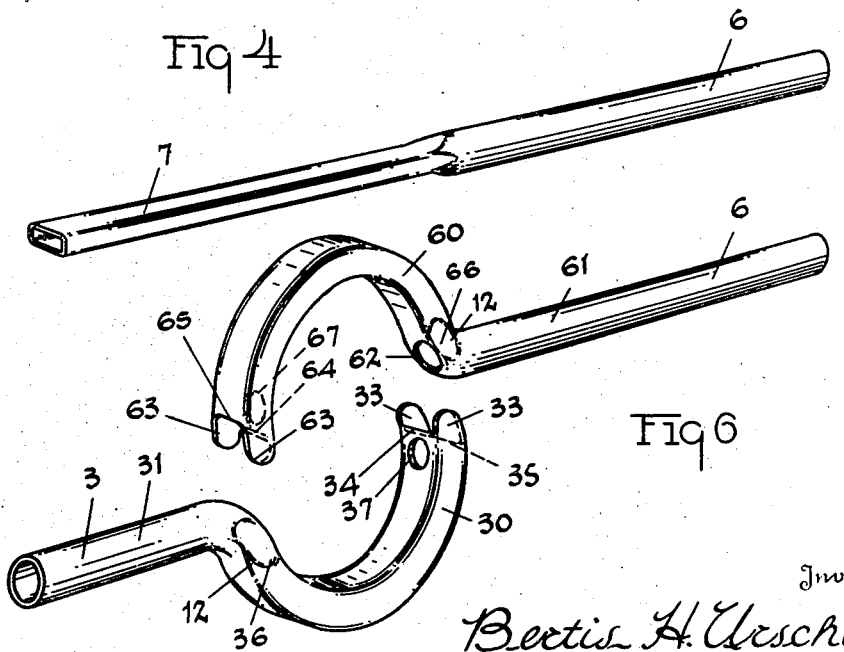
Fig 6

Patented Apr. 19, 1949

2,467,605

UNITED STATES PATENT OFFICE 2,467,605

AXLE HOUSING AND GEAR CASING UNIT AND METHOD OF MAKING SAME

Bertis H. Urschel, Bowling Green, Ohio, assignor to The Urschel Engineering Company, Bowling Green, Ohio, a corporation of Ohio Application May 2, 1946, Serial No. 666,724

17 Claims. (Cl. 74—607)

My invention relates to axle housing and gear casing unit structures for vehicles. The invention particularly relates to an improved, lightweight and relatively inexpensive axle housing and gear casing unit readily adaptable for use on automobiles.

My invention has for its objects to provide an axle housing and gear casing unit formed directly from thin lightweight steel tubing and a method of making the same. My invention provides an axle housing and gear casing unit construction in which the entire wall fiber of a tube blank is utilized. The invention also provides a method of fabrication of an axle housing and gear casing unit in which the tube stock, without slitting or removal of material from the wall of the tube blank, is bent to form a strong but light axle housing and gear casing unit.

My invention particularly has for an object to provide an axle housing and gear casing unit in which the elements forming the gear casing or "banjo" portion are of unbroken tubular cross-sectional profile. The advantages gained thereby in rigidity and sturdiness enable use of light gauge and weight tubular stock. The resulting unit is far superior to and a considerable improvement over the structures of the prior art, as illustrated by the patents to Torbensen No. 1,485,443, Palm No. 1,638,873 and Mogan et al. No. 1,091,751.

The structures of the prior art have been demonstrated to lack the necessary rigidity and sturdiness, particularly, in the gear casing or "banjo" portion. To overcome this fault, the use of reinforcing rings has been suggested, the rings being bolted or welded to the weak portion. This remedy not only necessitates provision of an additional part, but also requires an arrangement and the additional labor by which the ring is affixed. Such an adaptation adds materially to the production costs of the unit. Much of the savings is thus lost and the weight thereof disadvantageously increased.

I propose that the tube stock, with its wall substantially intact, be bent to form the gear casing or "banjo" portion, as distinguished from my predecessors' use of split tube or channel shaped elements for this purpose. The rigidity of the material of the bent intact tube is sufficient to eliminate the need for reinforcing rings or other like bracing means. Consequently I am able to use metal stock of lighter gauge than heretofore used for the purpose.

Advantages of bending, shaping and fabrication, likewise, reside in using the whole of the tube stock. These advantages, readily apparent to those skilled in the art, make for a corresponding lower production cost of the unit. Embodiments of my invention will successfully perform their function and will weigh 30% less than any commercial embodiment of the prior art known to me.

Another particular object of the invention is to provide a method of forming an axle housing and gear casing unit direct from thin lightweight steel tubing. The invention provides a method of utilizing two tubes, bending a section of each tube arcuately and joining the ends of the bent sections together to define a substantially curved gear receiving space or "banjo" portion therebetween. To my knowledge, no one heretofore has thus formed or provided a "banjo" portion of the resulting structure.

The invention consists in other features and advantages which will appear from the following description, upon examination of the drawings, and from the claims hereto appended. Structures and methods containing the invention may partake of different forms and utilize various means of fabrication and still embody the invention. To illustrate a practical application of the invention, I have selected an axle housing and gear casing unit and a method of making same, as examples that contain the invention, and shall describe the selected structure and method hereinafter, it being understood that variations may be made therein without departing from the spirit of the invention. The particular structure and method selected is shown in the accompanying drawings and described hereinafter.

Figure 2:
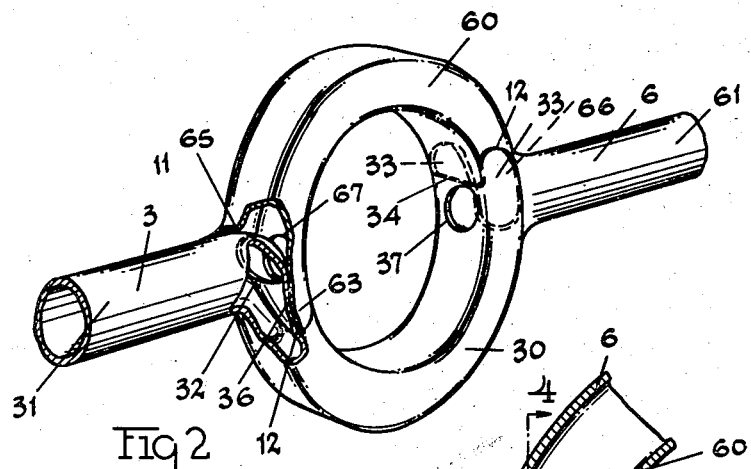
Figure 3:
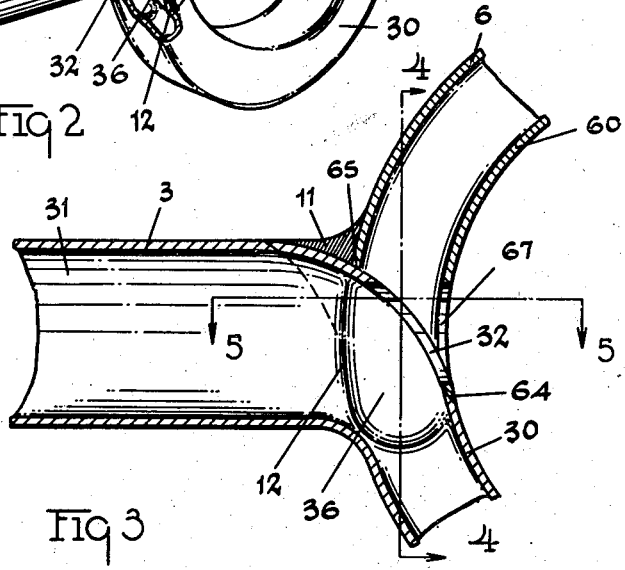

Fig. 1 of the accompanying drawings is a front elevational view of an axle housing and gear casing unit embodying the features of my invention and made in accordance with the method of making the same under my invention. Fig. 2 is an enlarged perspective view of the gear casing or "banjo" portion and its connected axle housing arms of the unit shown in Fig. 1, certain of the walls being shown broken away to facilitate illustration. Fig. 3 is an enlarged longitudinal and vertical sectional view of the unit shown in Fig. 1, taken in the area of the juncture of the gear casing or "banjo" portion with one of the axle housing arms. Fig. 4 illustrates a view of a section taken along the plane of the line 4—4 indicated in Fig. 3. Fig. 5 is a view of a section taken along the plane of the line 5—5 indicated in Fig. 3. Fig. 6 is a perspective view of the component tubular parts, as they may be progressively formed and assembled, to produce the axle housing and gear casing unit shown in Fig. 1.

The axle housing and gear casing unit, shown in the drawings, is formed from two pieces of lightweight steel tubing. The pieces of the preferred form of construction are of identical length and may be used for forming either the left or right end of the unit. Consequently, there is no need to separate, classify and bin the parts of my unit, as often is required in the fabrication of prior art units.

The pieces are of sufficient length that when a section of each is bent arcuately and the ends of each section placed in juxtaposition, the arcuately bent sections define and enclose a space with a substantially curved perimeter to house and case the differential gear of a vehicle transmission. Preferably, the pieces are of a length greater than that of the axle shaft or spindle to be housed, but less than that of the complete unit to be formed.

A section of each length of tube is arcuately bent so that the chordal line of the arc defined by the bent section is in alignment with the centroidal and symmetrical axes of the unbent section of the tube. Even at this stage, the tubes of the preferred form are each so similar that there is no need to classify and bin them as left, right, upper or lower elements. Also the bending of both tubes may be effected in or over the same die member.

Each of the two tubes is then placed so that the ends of the bent section are juxtaposed with the ends of the bent section of the other tube and with the unbent sections of both tubes extending in opposite directions. Suitable affixing of the juxtaposed ends of the bent sections, as by welding, assures against separation and completes the unit. In the preferred form of construction, the joining or affixing of the ends of the bent section is reinforced by structural laps and joints, which greatly increase the strength of the unit.

Referring now to the particular and preferred embodiment of my invention shown in the drawings, the axle housing and gear casing unit I is formed of two lightweight steel tube parts 3 and 6. The tube part 3 has an arcuately bent section 30 and an unbent or straight arm section 31. The tube part 6 has a corresponding bent section 60 and an arm section 61.

The arc in which each of the sections 30 and 60 is bent has a chordal line in alignment with the centroidal and symmetrical axes of their respective arm sections 31 and 61. Further, the arcs of the sections 30 and 60 are such that when the ends of the sections are placed in juxtaposition, the sections 30 and 60 define a space therebetween having a substantially curvilinear or circular perimeter. The circular space defined by the sections is of a dimension to permit some portion of the conventional differential of a vehicle transmission to be housed thereby and to rotate therethrough.

Preferably, before arcuately bending the sections 30 and 60, the portion of the tubes 3 and 6, from which bent sections 30 and 60 are to be formed, is planed or squared in cross-sectional profile to preform a portion 7, illustrated in Fig. 6 of the drawings. The squared portion 7 is then arcuately bent to form the section 30 or 60 as the case may be. The preliminary squaring of portion 6 of sections 30 and 60 facilitates arcuate bending and when bent gives increased rigidity to the differential gear casing part formed by the sections 30 and 60. Further, the flat faces of the sides of sections 30 and 60 lend themselves more readily to mating with the commonly used cover plate, on one side, and the gear mount on the other side to completely enclose the differential gear of the transmission involved.

The unbent or straight arm sections 31 and 61 adjoin their respective sections 30 and 60. The sections 31 and 61 are of a length slightly less than the axle spindles or shafts 8, which are to be housed by the sections. The sections 31 and 61 may be provided with the usual vehicle and related mounting parts, such as the spring pads 9 welded near the outer end of the sections.

In order that the spline end 10 of each axle shaft 8, housed in sections 31 and 61, may extend into the space between the sections 30 and 60, the tube 3 has an opening 32 formed in the wall of the tube proximate the point of juncture between the sections 30 and 31. The opening 32 is concentric with the centroidal and symmetrical axes of the section 31 and is dimensioned to permit the shaft 8 to extend therethrough. The tube 6 also has a corresponding opening 62 proximate the point of juncture of sections 60 and 61 through which its respective axle shaft end 10 extends.

Thus, when the two tubes 3 and 6 are assembled with the ends of tubular bent section 30 adjoining and connected to the ends of tubular bent section 60 and the tubular arm sections extending in opposite directions, an axle housing and gear casing unit of exceeding lightness but of sturdy rigidity is formed. The continuity of the wall fiber about the centroidal axis of the tubular "banjo" and arm parts of the unit assures a load carrying bridge member of considerable strength. The strain of the load at this substantially medial point is effectively dissipated in the balanced and evenly distributed tension and compression resistances exerted by the entire tube skin forming the "banjo" part. Consequently, the need of reinforcing rings, bracing struts or other shoring means is eliminated with resultant cost savings.

Various arrangements for connecting the ends of section 30 to the ends of section 60 may be utilized to good advantage. The character of my design of connecting arrangement lends itself not only to giving a finished one-piece appearance to the completed unit, but also in serving to provide extended lines of support reactive to the load. Broadly, the connecting arrangement of my invention utilizes frictional resistance to end displacement which resides in lapping the connected parts over considerable mutual surface areas. The arrangement also utilizes the resistance to end displacement which resides in dovetailing two otherwise relatively movable bodies. Further, the invention utilizes the resistance to end displacement which resides in mortising the bodies to brace the same against relative angular movements. My arrangement readily lends itself to fillet welding to give not only the desired appearance of one-piece unit when finished, but also to lock the ends of the sections together. The nature of the connection is such that only slight strains, well within the capacity of the weld, are exerted upon the welded joint.

Referring particularly to the drawings, it will be noted that the free end of the section 30 is cut to form two spaced ears 33, and the free end of section 60 has two corresponding ears 63. The ears 33 and 63 are arcuate in lateral profile. They extend from their respective sections 30 and 60 along lines having circular continuity with the arc of their respective sections. The ears extend laterally in parallel planes which are also parallel to the centroidal and symmetrical axes of their respectively related arm sections 31 and 61. The ears 33 form yoke or crotch arms for receiving the end of section 60, which adjoins the section 61, therebetween. The ears 63 are similarly designed and have the same relation to the end of arm section 30 which adjoins arcuate section 31.

The ears 33 are joined by an edge 34 of the tube section 30 on the inner side of the arcuate contour of said section and by an edge 35 on the outer side of said section 30. The ears 63 are, likewise, joined by a corresponding inner edge 64 and outer edge 65. The inner edges 34 and 64 preferably have feathered faces approximating the arcuate contour of inner wall of the tube of sections 60 and 30 respectively. The edges 34 and 64 are substantially straight throughout their lengths and each extends along a line which is substantially parallel to an axial projection of the respective arcuate section 30 or 60, as the case may be.

The outer edges 35 and 65 are arcuate in profile approximating the curve of the end of sections 61 and 31, at the point of juncture with their respective sections 60 and 30. The edges 35 and 65 are preferably blunt in facial contour.

When the tube parts 3 and 6 are brought together, in the manner shown in Fig. 6 of the drawings, the end of the section 60 at the point of juncture thereof with the section 61 is located between the spaced ears 33 and the end of section 30 between the spaced ears 63. The feathered edge 34 comes in surface contact with the inner surface of the section 60 to complete the flow of the curving contour established by the conjunction of sections 30 and 60. Correspondingly, the edge 64 contacts the inner surface of the section 30. The outer edge 35 abuts against the surface of the end of the section 61 proximate to the juncture thereof with the section 60. The outer edge 65 also abuts against the surface of the end of section 31.

Hence, the ends of the sections 3 and 6 are locked together. The ears 33 and 63 resist any twist or torque differential that may be set up between the parts 3 and 6. The overlapping of the ears 33 and 63 with the surfaces of the sections 60 and 30, respectively, and the abutting of the edges 35 and 65 with the surfaces of the sections 61 and 31, respectively, tend to prevent lateral separation of the parts. By providing a suitable fillet weld 11, along the lines of meeting of the edges 34, 64, 35 and 65 with the surfaces mentioned above, the connection is further strengthened. It is also desirable to fillet weld the edges of the ears 33 and 63 to the surfaces contacted by said ears.

Preferably, the side surfaces of the sections 30 and 60 proximate to the juncture thereof with the sections 31 and 61 are recessed to form pads 36 and 66. The pads 36 and 66 have approximately the same contour and lateral dimension as the ears 33 and 63. The pads 36 and 66 are adapted to bear and receive the ears 63 and 33 in surface engagement. The ears may be bent slightly toward each other to clasp the pad surfaces. The formation of the pads produces shoulders 12 which tend to brace the ears against lateral angular movement. Hence, the shoulders 12 in their relation to the edges of the ears 33 and 63 prevent angular relative movement of the parts 3 and 6. The weld metal 11 may be filleted between the edges of the ears 33 and 63 and the shoulder 12 of the pads to lock the parts against movement.

Any projecting irregularities may then be ground away and the joint polished to give, when complete, a one-piece appearance as illustrated in Fig. 1 of the drawings.

Preferably to further reinforce the juncture of the parts, an opening 37 of the approximate diameter of the axle shaft 8 is formed in the inner wall of section 30. The opening 37 is concentric with the opening 62 in part 6 and forms means for supporting axle shaft bearing sleeves of the conventional form. A corresponding opening 67 is formed in the part 6 and serves like purposes. Thus, the parts 3 and 6, when assembled with the shafts 8, are further braced against lateral relative movement by the interlocking of the shafts with the openings 32 and 67 and the openings 62 and 37.

It will be observed that tubular axle housing and gear casing unit, made in accordance with the design and method of my invention, is eminently capable of withstanding the stress of vehicle load and torque to which such units are subject despite its advantageous light weight. It is also apparent that such a unit may be fabricated at a minimum of expense and have maximum production adaptability. While I have illustrated and described the best form and method of my invention now known to me, as required by the statutes, those skilled in the art will readily understand that changes may be made without departing from the spirit of my invention as described and set forth in the hereto appended claims.

I claim:

1. An axle housing and gear casing unit having a pair of spaced elongated tubular arm sections and a bowed tubular central section providing means for connecting the relatively proximate inner ends of said arm sections together and extending across the space therebetween.

2. An axle housing and gear casing unit having a pair of spaced elongated tubular arm sections, each section having its centroidal axis in alignment with the centroidal axis of the other section; and a tubular central section providing means for connecting the relatively proximate ends of said arm sections together and extending through the space therebetween, the centroidal axis of the central section being in the same plane as and in disalignment with the centroidal axes of the arm sections.

3. An axle housing and gear casing unit having a pair of spaced elongated tubular arm sections, each section having its centroidal axis in alignment with the centroidal axis of the other section; and a tubular central section providing means for connecting the relatively proximate ends of said arm sections together and extending through the space therebetween, the centroidal axis of the tubular central section being in the same plane as and in disalignment with the centroidal axes of the arm sections, the tubular central section being integral with at least one of said arm sections.

4. An axle housing and gear casing unit having a pair of spaced elongated tubular arm sections and a pair of oppositely bowed and spaced tubular central sections connecting the relatively proximate inner ends of said arm sections and extending across the space therebetween.

5. An axle housing and gear casing unit having a pair of spaced elongated tubular arm sections, each section having its centroidal axis in alignment with the centroidal axis of the other section; a pair of oppositely bowed and spaced tubular central sections providing means for connecting the relatively proximate inner ends of said arm sections together, each bowed section extending through the space between the arm sections with the centroidal axes thereof in a common plane with the centroidal axis of the other bowed section and with the centroidal axes of the arm sections; and one of said bowed sections being integral with one of said arm sections.

6. An axle housing and gear casing unit having a pair of spaced elongated tubular arm sections, each section having its centroidal axis in alignment with the centroidal axis of the other section; and a pair of oppositely arcuately curved and spaced tubular central sections providing means for connecting the relatively proximate inner ends of said arm sections together, said central sections disposed in a plane extending parallel to a straight line joining said centroidal axes through the space between said arm sections, each of said central sections being integral with one of said pair of arm sections, and means for joining each of said central sections integral with one of said arm sections to the other of said arm sections.

7. An axle housing and gear casing unit having a pair of spaced elongated tubular arm sections, each arm section having its symmetrical axis in alignment with the symmetrical axis of the other arm section; a pair of central tubular sections, each central section being curved semi-circularly and integral with the end of one of said arm sections, both central sections disposed in end to end relation to define a substantially circular space therebetween; and means for connecting the free end of each central section to the integrated end of the other central section.

8. An axle housing and gear casing unit having a pair of spaced elongated tubular arm sections; a pair of arcuately curved tubular central sections, each central section having a cross-sectional profile different from the cross-sectional profile of the arm sections and being integral with an end of one of said arm sections; and means supported at the free end of each central section adapted to engage the integrated end of the other central section to connect the central sections together.

9. An axle housing and gear casing unit having a pair of spaced elongated tubular arm sections; a pair of arcuately curved tubular central sections, each tubular central section being integral with an end of one of said arm sections; a pair of spaced ears extending from the free end of each central section and adapted to receive the integrated end of the other central section therebetween; and means for restraining movement of the said integrated end relative to said ears.

10. An axle housing and gear casing unit having a pair of spaced elongated tubular arm sections; a pair of arcuately curved tubular central sections, each tubular central section being integral with an end of one of said arm sections; a shoulder formed on each central section proximate to the integrated end thereof; and a pair of spaced ears extending from the free end of each central section and adapted to receive the integrated end of the other central section therebetween, one of said ears engaging said shoulder to resist angular movement of one central section relative to the other.

11. An axle housing and gear casing unit having a pair of spaced elongated tubular arm sections; and a pair of arcuately curved tubular central sections, each of said tubular central sections having a cross-sectional angular profile and providing means for connecting the proximating ends of said arm sections together.

12. An axle housing and gear casing unit for a driven vehicle axle and differential gear assembly, the axle housing portion of which unit includes a member through which a vehicle axle shaft of the assembly to be housed extends, the member having a pad portion adapted to supportingly engage a vehicle load bearing part, the unit being characterized by the fact that the gear casing portion thereof includes a tubular element extending from one end of the said axle housing member across a space of a dimension greater than that in which a portion of a gear to be cased may be disposed.

13. An axle housing and gear casing unit as described in claim 12 further characterized by the fact that the tubular element extends arcuately from the end of said member and across said space.

14. An axle housing and gear casing unit as described in claim 12 further characterized by the fact that the gear casing portion thereof includes a second tubular element disposed in co-planar non-parallelism with the first mentioned tubular element together with means for connecting the ends of both tubular elements together to define a space therebetween.

15. An axle housing and gear casing unit as described in claim 12 further characterized by the fact that the tubular element extends arcuately from the end of said member across said space and said gear casing portion further includes a second tubular element extending arcuately from said member across said space in co-planar non-parallelism with the first mentioned tubular element together with means for connecting the ends of both tubular elements together to define a space between said tubular elements.

16. A method of making an axle housing and gear casing unit which includes the steps of taking a pair of tubes, each of a length greater than the length of an axle shaft to be housed and less than that of the unit to be formed; curvedly bending that section of each tube extending beyond a section thereof less in length to that of an axle shaft to be housed, to dispose said bent section substantially in an arc, the chordal line of which is aligned with the centroidal axis of the unbent section of the tube; forming an opening in each tube wall, concentric with the respective centroidal axis of said unbent section of said tube; placing each tube so that the unbent section thereof is spaced from and extends away from the counterpart section of the other tube with their respective centroidal axes in alignment and so that the bent sections extend in coplanar, non-parallelism in a plane parallel to a straight line extending across the space between and joining the centroidal axes of said unbent sections, to locate the free end of each bent section in engagement with the surface of the other tube substantially at the juncture of the bent and unbent sections of said other tube; and connecting said free end of each bent section of each tube to the said respectively engaged surface of the other tube.

17. A method of making an axle housing and gear casing part which includes the steps of taking a tube of a length greater than that of an axle shaft to be housed; flattening a lateral surface of that section of the tube, extending beyond the section thereof less in length to that of an axle shaft to be housed, to form a seating surface for a gear casing closure bowl; curvedly bending said tube section of flattened lateral surface to dispose last named section substantially in an arc, the chordal line of which is aligned with the centroidal axis of the unbent section of the tube; and forming an opening in the tube wall, concentric with said centroidal axis and in the area of juncture between bent and unbent sections of the tube.

BERTIS H. URSCHEL.

REFERENCES CITED

The following references are of record in the file of this patent:

UNITED STATES PATENTS

| Number | Name | Date |
| --- | --- | --- |
| 425,395 | Wingate et al. | Apr. 8, 1890 |
| 559,839 | Brinkman | May 12, 1896 |
| 1,127,399 | Burkhardt | Feb. 9, 1915 |
| 1,480,086 | Lyon | Jan. 8, 1924 |
| 1,516,148 | Burkhardt | Nov. 18, 1924 |
| 1,638,873 | Palm | Aug. 16, 1927 |
| 1,753,586 | Warwick | Apr. 8, 1930 |
| 2,077,454 | Almdale | Apr. 20, 1937 |
| 2,133,092 | Gettig | Oct. 11, 1938 |
| 2,366,141 | Alderfer | Dec. 26, 1944 |